(Model.)
J. KRAUPA.
GRATE.
No. 252,606. Patented Jan. 24, 1882.
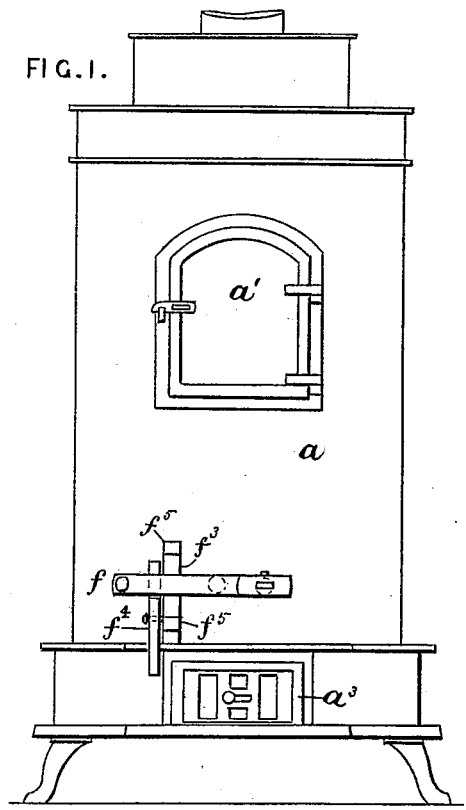
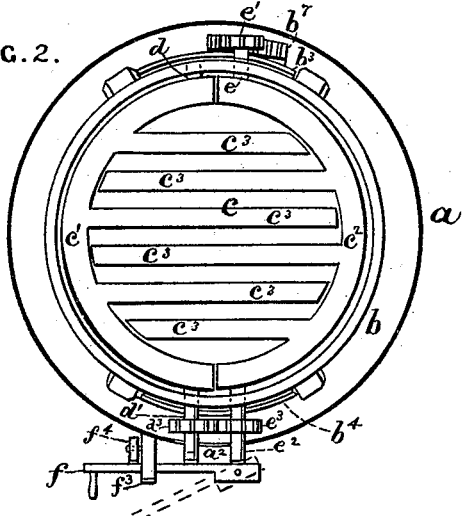
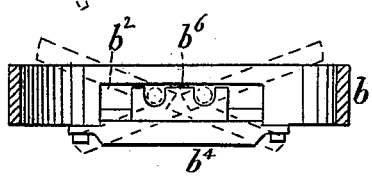
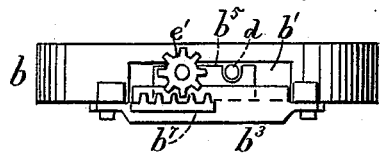
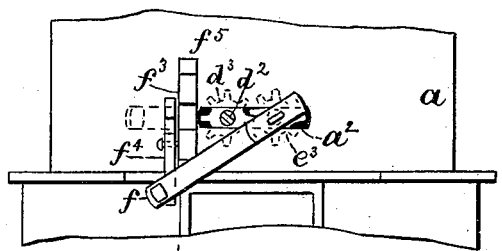
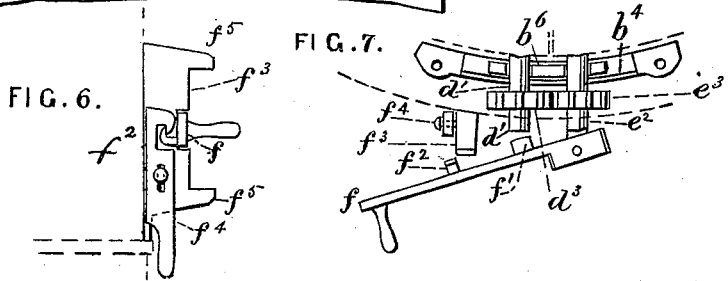
WITNESSES:
P. B. Turpin
F. W. Wheat
INVENTOR:
Joseph Kraupa
By R. S. & A. P. Lacey
Attorneys.

UNITED STATES PATENT OFFICE.

JOSEPH KRAUPA, OF ST. LOUIS, MISSOURI.

GRATE.

SPECIFICATION forming part of Letters Patent No. 252,606, dated January 24, 1882.

Application filed October 13, 1881. (Model.)

*To all whom it may concern:*

Be it known that I, JOSEPH KRAUPA, a citizen of the United States, residing at 902 South Seventh street, in the city of St. Louis and State of Missouri, have invented certain new and useful Improvements in Grates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in grates; and it consists in the construction and arrangement of the several parts hereinafter described, and pointed out in the claims.

In the drawings, Figure 1 is an elevation of a stove. Fig. 2 is a plan of a grate and fire-pot. Fig. 3 is a cross-section of fire-pot, with tilted position of grate-sections indicated in dotted lines. Fig. 4 is a view of rear side of fire-pot. Fig. 5 is a partial front view of stove. Fig. 6 is an edge view of the latching device, and Fig. 7 is a detached plan view of certain details.

$a$ is the outer casing, having fuel-door $a'$ and horizontally-elongated opening $a^2$ and ash-door $a^3$.

$b$ is the fire-pot.

$b'$ is an elongated opening in rear of fire-pot, near its bottom.

$b^2$ is an elongated opening in the fire-pot, similar and diametrically opposite to the opening $b'$ and directly in rear of the opening $a^2$ in casing $a$.

$b^3$ is a segmental way extended slightly beyond the opening $b'$, and forming with the bottom of said opening suitable support for the carrier, hereinafter described.

$b^4$ is a way similar to the way $b^3$, and placed alongside the opening $b^2$.

$b^5$ is a carrier placed in the way $b^3$, and made shorter than the opening, in order that it may have horizontal play in said opening, and provided with semicircular bearings for the pivoting-rods of sections of grate, hereinafter described.

$b^6$ is a carrier placed in the way $b^4$, and similar to the carrier $b^5$.

$b^7$ is a rack-bar placed alongside and slightly below the way $b^3$ and between it and the casing $a$. I have shown this rack attached to the part $b^3$; but it will be understood it can be connected directly to fire-pot or to outer casing of stove, so it is held in position to be meshed by wheel $e'$, as shown and hereinafter described. This rack would have same function if arranged above the gear-wheel instead of below it, as shown.

$c$ is the circular grate, formed in sections $c'$ $c^2$, each provided with bars $c^3$ $c^3$, the bars of the one section entering the openings between the bars of the other section, as shown.

$d$ is a rod fixed to the rear of section $c'$ and bearing in carrier $b^5$.

$d'$ is a rod fixed to front of section $c'$. It bears in the carrier $b^6$, and is extended through the casing $a$, and has a slot, $d^2$, in its forward end, to receive the lug on the operating-handle hereinafter described.

$d^3$ is a gear-wheel fixed on the rod $d'$ between the casing $a$ and the fire-pot.

$e$ is a rod fixed to the rear of section $c^2$. It bears in carrier $b^5$, and has its end extended over the rack-bar $b^7$.

$e'$ is a gear-wheel placed on end of rod $e$, and arranged to mesh with and roll from side to side on the rack-bar $b^7$, as shown.

$e^2$ is a rod fixed to front of section $c^2$. It bears in the carrier $b^6$, and is extended through the casing $a$, and its front end is flattened to enter slot in the operating-lever.

$e^3$ is a gear-wheel fixed on rod $e^2$ between the fire-pot and the casing $a$, and arranged to mesh with the gear-wheel $d^3$ on the rod $d'$.

$f$ is the operating-lever. It has formed in one end a slot, which fits over the flattened end of rod $e^2$, to which it is fastened by a pin. It can thus be swung out freely without affecting the grates, while an upward or downward movement of the lever tilts both the sections of the grate. This is accomplished by the gear-wheel on rod $e^2$ meshing with the gear-wheel on rod $d'$, thus tilting the sections toward or away from each other as the operating-lever is raised or lowered. It will be seen the gear-wheel $e'$ on end of rod $e$, meshing with the rack-bar $b^7$ as the grates are tilted, will roll to left or right, according to the direction of the tilting, and take the carrier with it, thus giving an additional disturbance to the coals in the fire-pot. It will also be seen that, the carriers being shorter than the openings in the ways in which they are supported, the grate may be shaken laterally when it is not desired to dump the ashes.

$f'$ is a lug fixed on side of lever $f$ next the stove, and arranged to fit in the slot $d^2$ in end of rod $d'$ when the grate is in a horizontal position, and thus hold the sections firmly in position.

$f^2$ is a hook placed near the end of the lever, and arranged in proper position to be engaged by the latch hereinafter described.

$f^3$ is a bar fixed on front of stove, and having formed in its front a slot to receive the lever $f$ when it is swung in horizontally against the side of the stove.

$f^5 f^5$ are lugs formed at top and bottom of bar $f^3$, extended outward. The lever can be operated between these lugs, thus giving a limited rocking movement to the grate-sections.

$f^4$ is a drop-latch having formed through it an opening, through which passes a pin, by which it is connected to the bar $f^3$. The opening in the drop-latch is somewhat elongated, so that the latch can be raised or lowered. The latch has formed on its end a hook arranged to catch in the hook on the lever $f$ and hold the lever till it is released by raising the latch.

Having thus described my invention, what I claim, and desire to secure by Letters Patent, is—

1. A grate composed of the two grate-sections provided with front and rear pivot-bars bearing in sliding carriers placed in suitable ways, both front bars and one of the rear bars being provided with gear-wheels, the gear-wheels on front bars being arranged to mesh together, and the gear-wheel on rear pivot-bar being arranged to engage a rack-bar placed alongside the way, supporting the carrier on which said bar rests, substantially as set forth.

2. The combination of the fire-pot having formed through it horizontal openings with carriers made shorter than and placed in said openings, and provided with bearings to receive the pivot-bars of the grate-sections, whereby a lateral motion may be given the grate-sections, substantially as set forth.

3. In a stove, the combination of a fire-pot formed with openings through it, carriers made shorter than and placed and supported in said openings, and ways placed alongside and provided with bearing for the grate-sections, the tilting grate-sections, and means for operating, substantially as set forth.

4. The combination of the grate-sections, the front pivot bars of which are extended through the casing of the stove, the one having the operating-lever hinged to it, the said lever having a lug placed thereon and arranged to enter a slot formed in the end of the other front pivot-bar when the grates are in a horizontal position and firmly lock the grates in such position, substantially as set forth.

5. The combination of the hinged lever having hook $f'$ on its side next the stove, the bar $f^3$, fixed to the stove and having a slot formed in its front to receive the hinged lever, and the latch arranged to catch over the hook on the hinged lever and hold the said lever from an outward movement, substantially as set forth.

In testimony whereof I affix my signature in presence of two witnesses on this 13th day of September, 1881.

JOSEPH KRAUPA.

Witnesses:
J. B. PFOUTS,
WILL A. OVES.